United States Patent
Izumi et al.

(10) Patent No.: US 12,362,638 B2
(45) Date of Patent: Jul. 15, 2025

(54) RADIAL FLUX SYNCHRONOUS MACHINE AND ELECTRIC MOTOR-GENERATOR SYSTEM

(71) Applicant: National University Corporation Tokyo University of Marine Science and Technology, Toyko-to (JP)

(72) Inventors: Mitsuru Izumi, Toyko-to (JP); Kota Yamaguchi, Toyko-to (JP); Shinji Takei, Tokyo-to (JP); Tetsuya Ida, Tokyo-to (JP)

(73) Assignee: National University Corporation Tokyo University of Marine Science and Technology, Tokyo (JP)

( * ) Notice: Subject to any disclaimer, the term of this patent is extended or adjusted under 35 U.S.C. 154(b) by 260 days.

(21) Appl. No.: 17/924,634

(22) PCT Filed: Jan. 4, 2021

(86) PCT No.: PCT/JP2021/000030
§ 371 (c)(1),
(2) Date: Nov. 10, 2022

(87) PCT Pub. No.: WO2021/229856
PCT Pub. Date: Nov. 18, 2021

(65) Prior Publication Data
US 2023/0188017 A1    Jun. 15, 2023

(30) Foreign Application Priority Data
May 14, 2020    (JP) .................................. 2020-085441

(51) Int. Cl.
*H02K 16/02*    (2006.01)
*B63H 5/10*    (2006.01)
(Continued)

(52) U.S. Cl.
CPC ............... *H02K 16/02* (2013.01); *B63H 5/10* (2013.01); *B63H 21/17* (2013.01); *H02K 21/26* (2013.01)

(58) Field of Classification Search
None
See application file for complete search history.

(56) References Cited

U.S. PATENT DOCUMENTS

| 7,615,905 | B2 * | 11/2009 | Rolando Avila Cusicanqui ........ H02K 21/44 310/181 |
| 10,326,322 | B2 * | 6/2019 | Gandhi .................. H02K 21/44 |

(Continued)

FOREIGN PATENT DOCUMENTS

| JP | H201976493 A | 8/1990 |
| JP | 20052244000 A | 8/2005 |

(Continued)

OTHER PUBLICATIONS

Machine translation of Univ of Fukui [JP20052244000] (Year: 2005).*

(Continued)

*Primary Examiner* — Bernard Rojas
(74) *Attorney, Agent, or Firm* — Perkins Coie LLP

(57) ABSTRACT

A radial flux synchronous machine includes a stator in a cylindrical shape provided with a plurality of magnetic poles, an inner rotor disposed radially inward of the stator and having an inner armature opposing the magnetic pole from radially inward, and an outer rotor disposed radially outward of the stator and having an outer armature opposing the magnetic pole (from radially outward.

6 Claims, 7 Drawing Sheets

(51) Int. Cl.
    *B63H 21/17*      (2006.01)
    *H02K 21/26*      (2006.01)

(56) References Cited

U.S. PATENT DOCUMENTS

2009/0072645 A1*   3/2009   Quere .................... H02K 16/00
                                                                                              310/114
2013/0181562 A1*   7/2013   Gieras .................... H02K 16/02
                                                                            310/114

FOREIGN PATENT DOCUMENTS

| JP | 2009281385 A | 12/2009 |
|----|--------------|---------|
| JP | 2009292439 A | 12/2009 |
| JP | 2011061994 A | 3/2011 |
| JP | 2011130661 A | 6/2011 |
| JP | 2018074718 A | 5/2018 |
| JP | 2019092330 A | 6/2019 |

OTHER PUBLICATIONS

English translation of International Search Report for International Application No. PCT/JP2021/000030; Date of Mailing: Feb. 16, 2021; 2 pages.

International Preliminary Report on Patentability for International Application No. PCT/JP2021/000030; Date of Mailing: Nov. 15, 2022; 6 pages.

Notice of Reasons for Refusal for Japanese Patent Application No. 2020-085441; Date of Mailing: Aug. 16, 2024, with English translation; 6 pages.

* cited by examiner

|  | EXAMPLE 1 | EXAMPLE 2 |
|---|---|---|
| MAGNETIC FLUX DENSITY (T) | 6.0 | 0.24 |
| DIAMETER (m) | 2 | 2 |
| MAGNETIC POLE | BULK SUPERCONDUCTOR | PERMANENT MAGNET |
| NUMBER OF MAGNETIC POLES | 16 | |
| TEETH | M600-50A | |

FIG. 7

|  | EXAMPLE 1 | | EXAMPLE 2 | |
|---|---|---|---|---|
|  | INNER ROTOR | OUTER ROTOR | INNER ROTOR | OUTER ROTOR |
| MAXIMUM OUTPUT (kW) | 297 | 171 | 66 | 30 |

FIG. 8

RADIAL FLUX SYNCHRONOUS MACHINE AND ELECTRIC MOTOR-GENERATOR SYSTEM

CROSS-REFERENCE TO RELATED APPLICATIONS

This application is a National Phase of International Application No. PCT/JP2021/000030, filed on Jan. 4, 2021, the contents of which are hereby incorporated herein by reference in its entirety.

TECHNICAL FIELD

The present invention relates to a radial flux synchronous machine and an electric motor-generator system.

BACKGROUND

In recent years, in power generation using natural energy, use of sunlight and wind power has been spreading all over the world. Among them, a power generation system using a water flow or a tidal current, which is relatively easy to predict a power generation amount and has a higher energy density than wind power generation, is expected.

As a turbine used in a power generation system using a water flow or a tidal current or a rotation mechanism coupled to an electric motor, a contra-rotating turbine or a contra-rotating screw propeller mechanism including two rotation mechanisms arranged backward and forward is known (see, for example, JP 2009-292439A, JP 2011-130661A, JP 2009-281385A, and JP 2-197493A).

JP 2009-292439A discloses a contra-rotating screw propeller mechanism including two rotors that share one stator as drive sources of two screws in order to achieve reduced size and weight. This contra-rotating screw propeller mechanism is configured such that an inner shaft and an outer shaft are arranged coaxially, and a rear side screw attached to the inner shaft and a front side screw attached to the outer shaft are rotated in mutually opposite directions, thereby generating a propulsion in one direction.

JP 2011-130661A discloses a contra-rotatable generator including an inner pole rotor, an outer magnet rotor disposed radially outside the inner pole rotor, and a generator stator concentric with the two rotors. In this contra-rotatable generator, the magnet rotor encircles the pole rotor, and the pole rotor encircles the generator stator.

JP 2009-281385A discloses a gas turbine engine including a contra-rotating rotor incorporating a generator. In this gas turbine engine, the contra-rotating rotor includes a first hub provided with a first generator portion and a second hub provided with a second generator portion, and the first hub and the second hub are configured to move the first generator portion with respect to the second generator portion by rotating in opposite directions during use.

JP 2-197493A discloses an electric contra-rotating propeller in which a front propeller and a rear propeller are attached to an inner shaft and an outer shaft, respectively, and the inner shaft and the outer shaft are directly coupled to an electric motor to rotate in opposite directions. In this electric contra-rotating propeller, rotational speed imbalance of the front and rear propellers due to load imbalance can be automatically eliminated.

Such an electric motor-generator system using a contra-rotating turbine or a contra-rotating screw propeller mechanism is required to achieve high efficiency and high power density.

The present invention has been made in consideration of such point, and an object is to provide a radial flux synchronous machine and an electric motor-generator system capable of achieving high efficiency and high power density.

SUMMARY OF THE INVENTION

A radial flux synchronous machine according to an embodiment includes a stator in a cylindrical shape provided with a plurality of magnetic poles, an inner rotor disposed radially inward of the stator and having an inner armature opposing the magnetic pole from radially inward, and an outer rotor disposed radially outward of the stator and having an outer armature opposing the magnetic pole from radially outward.

In a radial flux synchronous machine according to an embodiment, each of the magnetic poles includes a plurality of magnets, and in one magnetic pole, each of the magnets may be arranged such that a plurality of the magnets have a rectangular shape as a whole when viewed from an axial direction of the inner rotor.

In a radial flux synchronous machine according to an embodiment, the magnet may include a bulk superconductor.

In a radial flux synchronous machine according to an embodiment, the inner armature may include inner teeth protruding radially outward and an inner coil wound around the inner teeth.

In a radial flux synchronous machine according to an embodiment, the outer armature may include outer teeth protruding radially inward, and an outer coil wound around the outer teeth.

An electric motor-generator system according to an embodiment includes a base portion attached to the radial flux synchronous machine according to the present embodiment, a front blade coupled to the inner rotor, and a rear blade coupled to the outer rotor.

According to the present invention, it is possible to achieve high efficiency and high power density of an electric motor-generator system.

BRIEF DESCRIPTION OF DRAWINGS

FIG. 7 is a view presenting a table summarizing performance of the radial flux synchronous machine according to an example of the present invention.

FIG. 8 is a view presenting a table summarizing the maximum output of the radial flux synchronous machine according to an example of the present invention.

DETAILED DESCRIPTION

Figure 1:
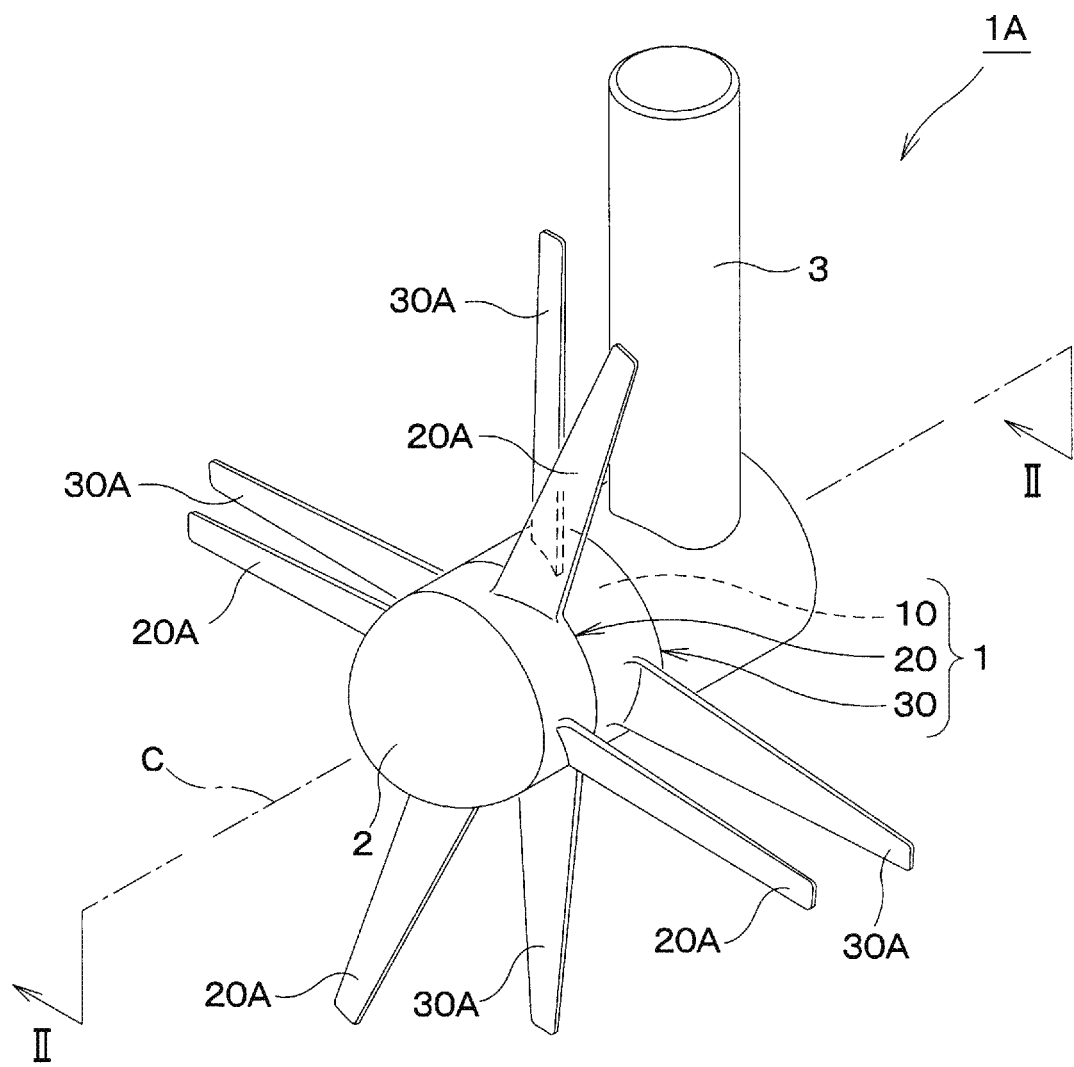
FIG. 1 is a schematic perspective view illustrating an electric motor-generator system according to an embodiment of the present invention.

An embodiment of the present invention will be described below with reference to the drawings. FIGS. 1 to 6 are views illustrating an embodiment. Each of the following drawings is schematically illustrated. Therefore, the size and shape of each part are appropriately exaggerated for easy understanding. It is possible to appropriately modify and implemented without departing from the technical idea. In the following drawings, the same parts are denoted by the same reference numerals, and a detailed description may be partially omitted. The numerical value such as dimensions and the material name of each member described in the present description are examples as an embodiment, and are not limited to this, and can be appropriately selected and used. In the present description, terms that specify shapes and geometric conditions, for example, terms such as parallel, orthogonal, and perpendicular, are intended to include substantially the same states in addition to strict meanings.

Electric Motor-Generator System

Figure 2:
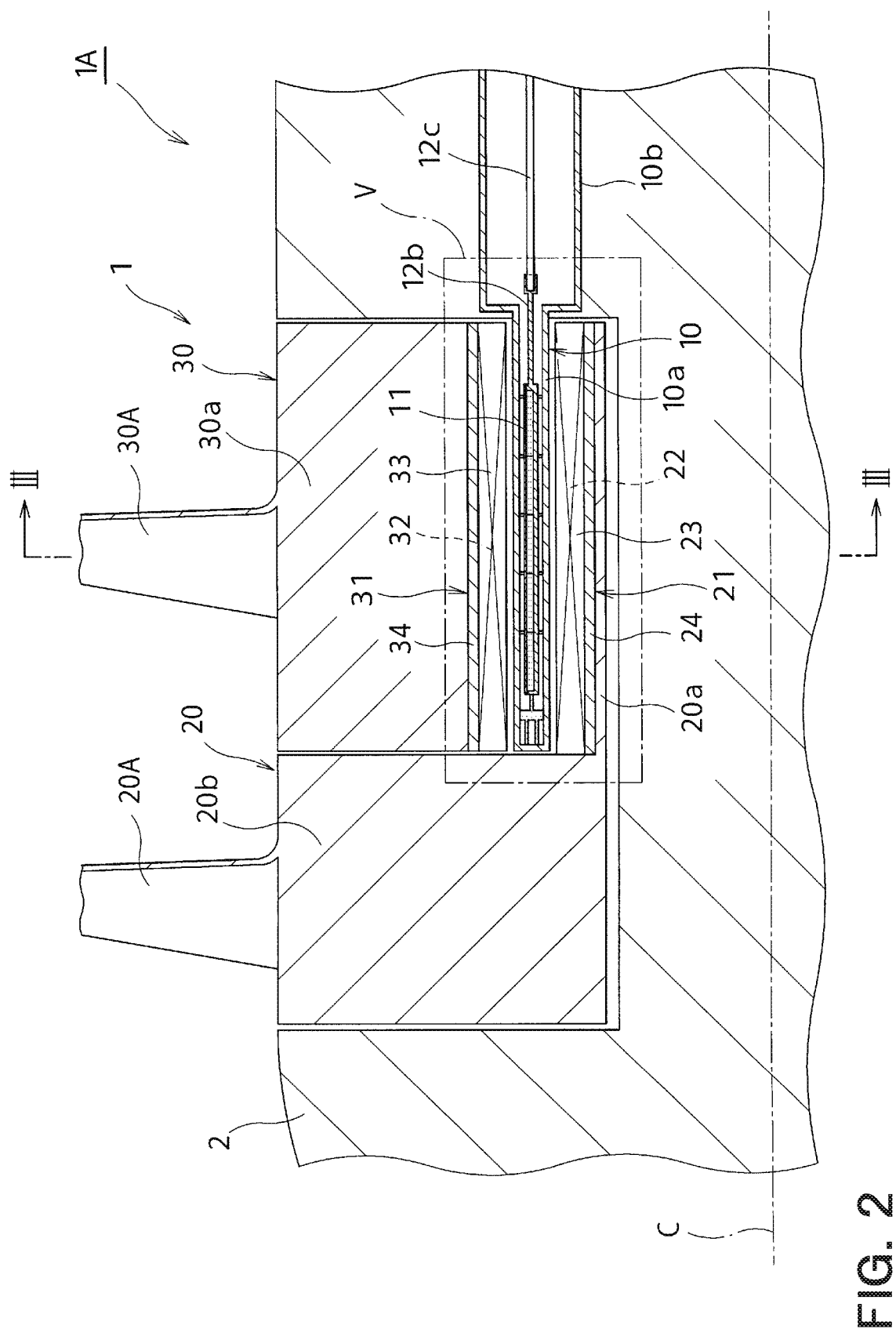
FIG. 2 is a cross-sectional view (cross-sectional view taken along line II-II in FIG. 1) illustrating the electric motor-generator system according to an embodiment of the present invention.

First, an outline of an electric motor-generator system 1A including a radial flux synchronous machine 1 according to an embodiment of the present invention will be described with reference to FIGS. 1 and 2. FIG. 1 is a schematic perspective view illustrating the electric motor-generator system 1A including the radial flux synchronous machine 1. FIG. 2 is a cross-sectional view illustrating the electric motor-generator system 1A. In the following explanation, a direction along a rotation axis C of an inner rotor 20 and an outer rotor 30 described later is referred to as axial direction, a direction orthogonal to the axial direction is referred to as radial direction, and a direction around the rotation axis C is referred to as circumferential direction.

As illustrated in FIGS. 1 and 2, the electric motor-generator system 1A includes a base portion 2, the radial flux synchronous machine 1 according to the present embodiment attached to the base portion 2, a front blade 20A coupled to the inner rotor 20 described later of the radial flux synchronous machine 1, and a rear blade 30A coupled to the outer rotor 30 described later.

Of them, the front blade 20A is configured to be positioned on an upstream side in a flow direction of a fluid (for example, sea water) relative to the rear blade 30A when power is generated using the electric motor-generator system 1A. On the other hand, the front blade 20A is configured to be positioned rearward in a traveling direction of the ship relative to the rear blade 30A when the electric motor-generator system 1A is used as a propulsor or the like of a ship. In the illustrated example, the electric motor-generator system 1A includes four front blades 20A and four rear blades 30A. The numbers of the front blades 20A and the rear blades 30A may be in different aspects.

The front blade 20A and the rear blade 30A are configured to rotate in opposite directions to each other. In the present embodiment, when power is generated using the electric motor-generator system 1A, by rotation of the front blade 20A, the inner rotor 20 described later rotates, and power is generated. By rotation of the rear blade 30A, the outer rotor 30 described later rotates, and power is generated. Then, the current generated by the power generation is configured to be supplied to a battery or the like via a cable not illustrated. On the other hand, when the electric motor-generator system 1A is used as a propulsor or the like of a ship, in the present embodiment, the front blade 20A rotates by rotation of the inner rotor 20 described later by power from a power source not illustrated. The rear blade 30A rotates by rotation of the outer rotor 30 described later by power from the power source (not illustrated).

Such the electric motor-generator system 1A can be suitably used for tidal power generation, for example. When the electric motor-generator system 1A is used for tidal power generation, the electric motor-generator system 1A may be attached to a structure (megafloat, mining station for mining natural gas on the sea, and the like) floating on the sea, for example, or may be attached to a structure fixed to the sea floor. When the electric motor-generator system 1A is used in a state of being attached to a structure floating in the sea, the electric motor-generator system 1A may be suspended via a support member 3 coupled to the base portion 2 such that, for example, the electric motor-generator system 1A is positioned in the sea. The electric motor-generator system 1A may be used for power generation by being incorporated into a ship. Furthermore, the electric motor-generator system 1A may be used as a propulsor of a ship, for example, by being incorporated into the ship.

Radial Flux Synchronous Machine

Figure 3:
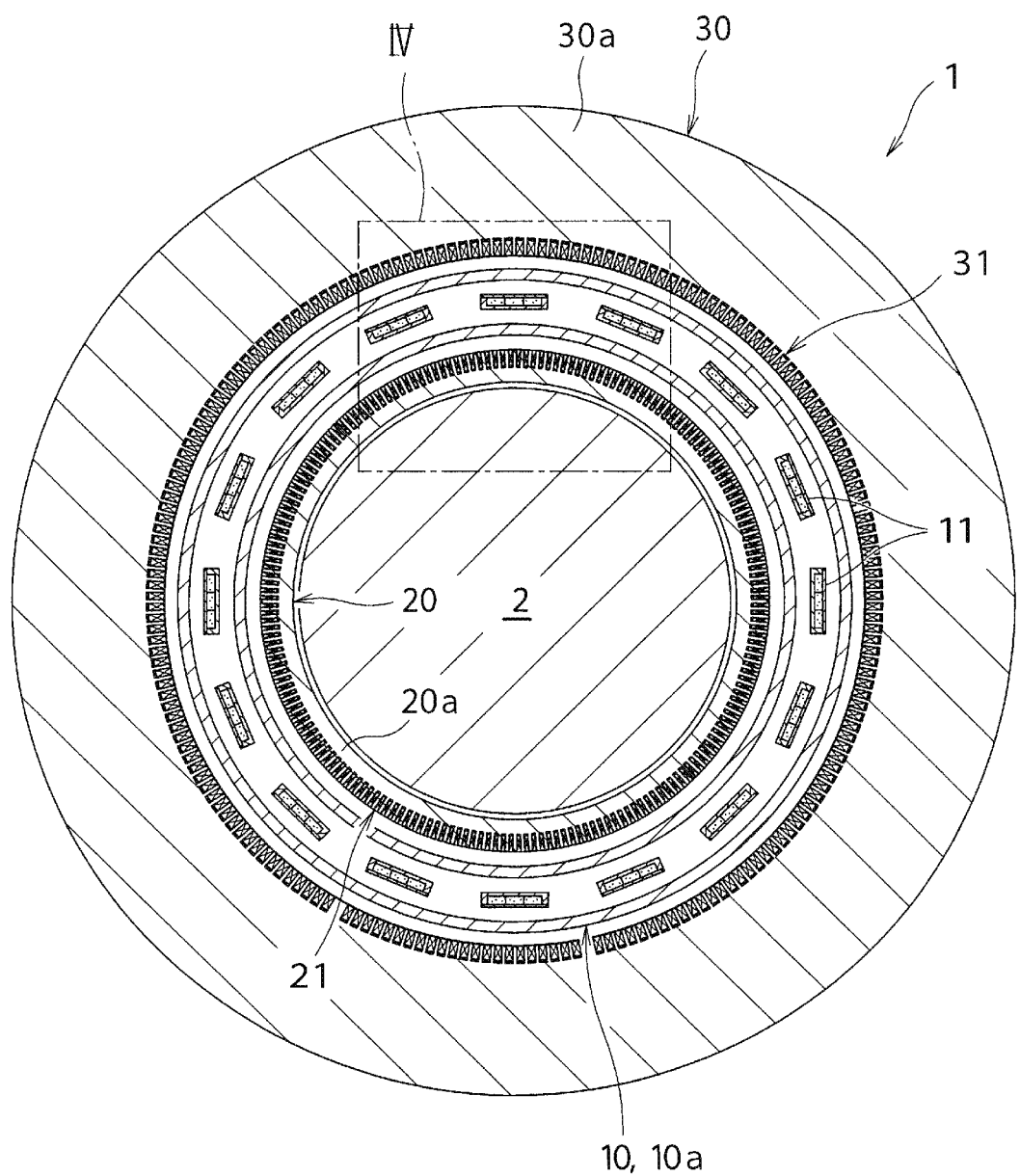
FIG. 3 is a cross-sectional view (cross-sectional view taken along line III-III in FIG. 2) illustrating a radial flux synchronous machine according to an embodiment of the present invention.
Figure 4:
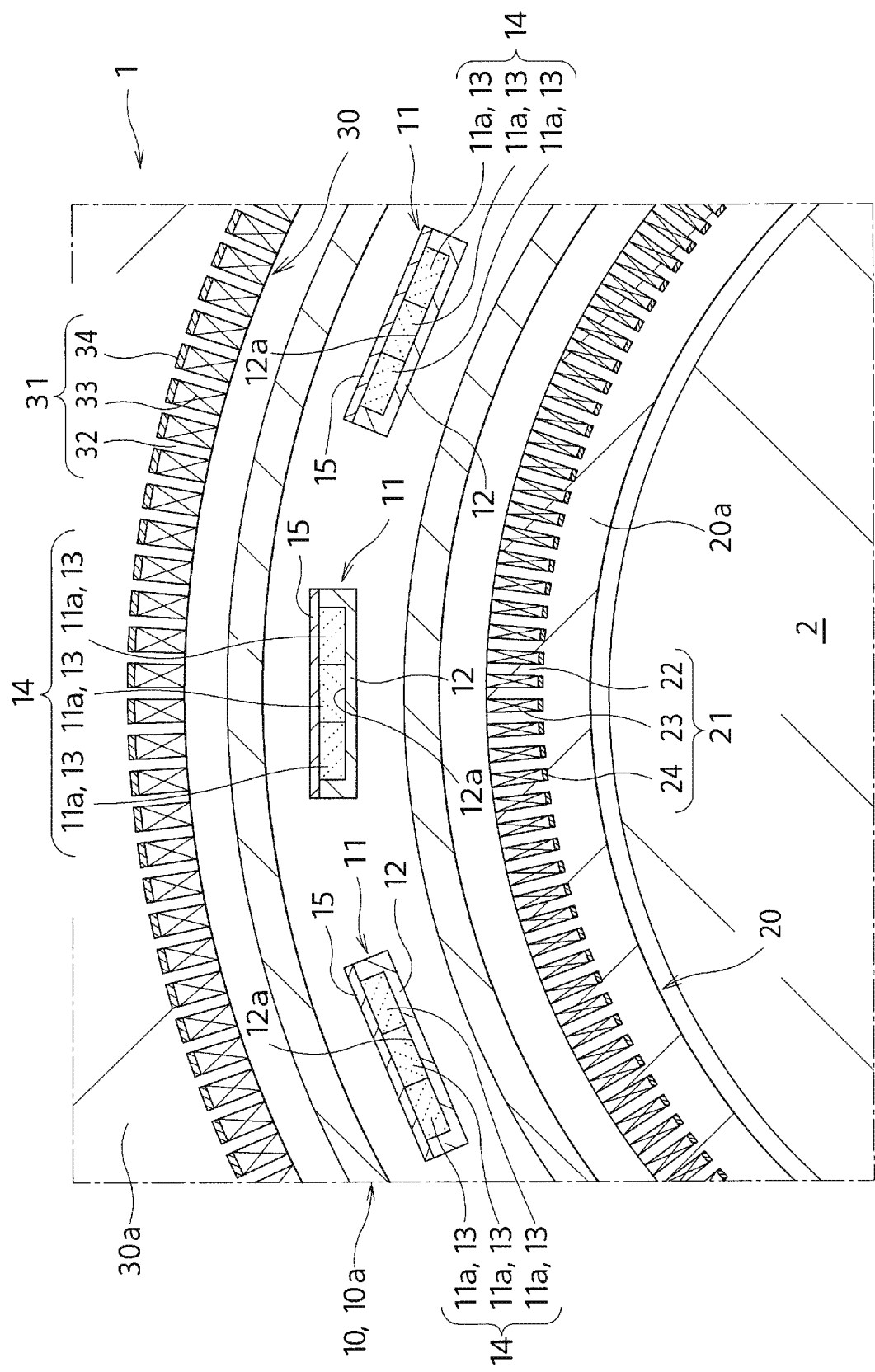
FIG. 4 is a partially enlarged view (enlarged view corresponding to a portion IV in FIG. 3) illustrating the radial flux synchronous machine according to an embodiment of the present invention.
Figure 5:
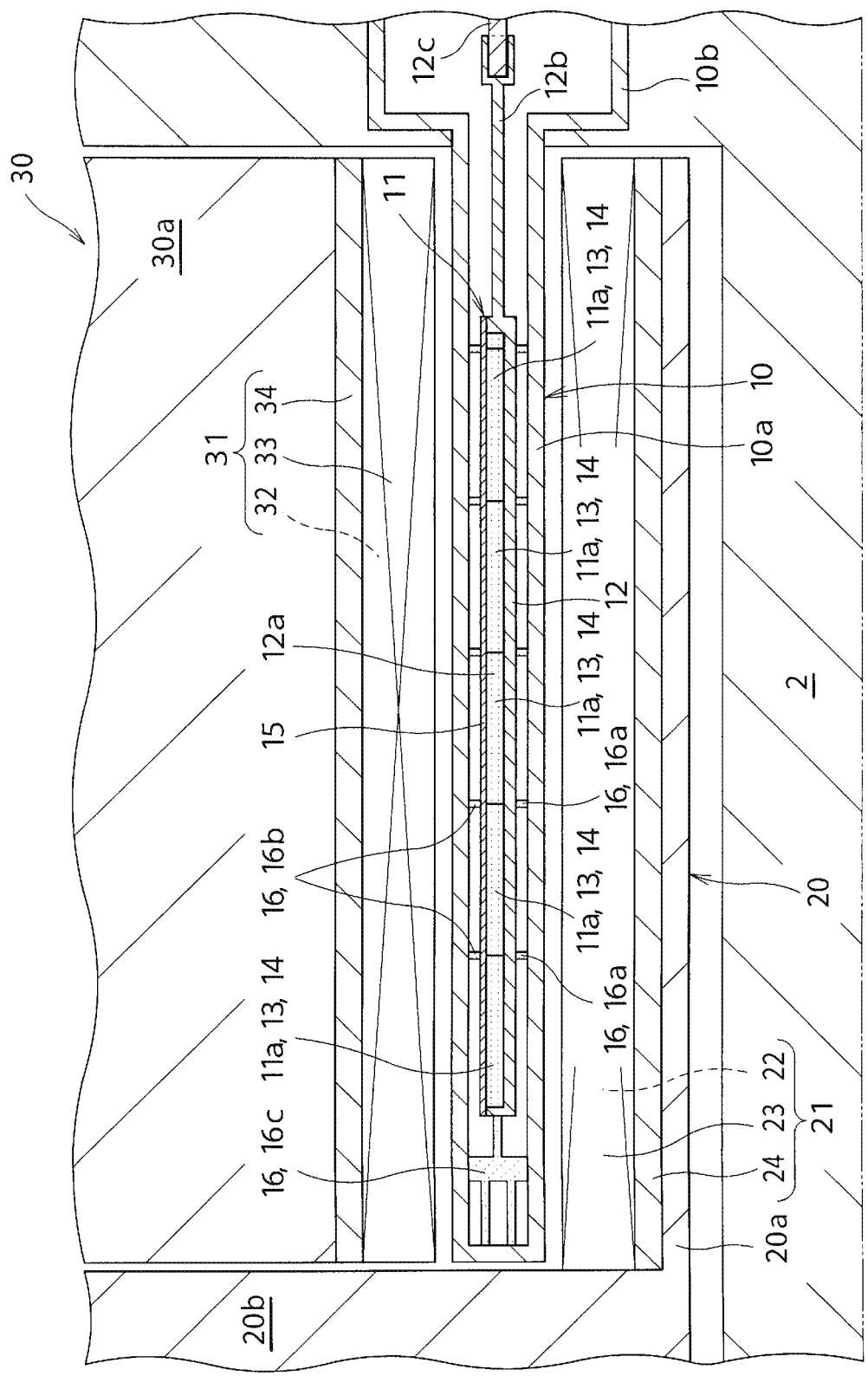
FIG. 5 is a partially enlarged view (enlarged view corresponding to a portion V in FIG. 2) illustrating the radial flux synchronous machine according to an embodiment of the present invention.
Figure 6:
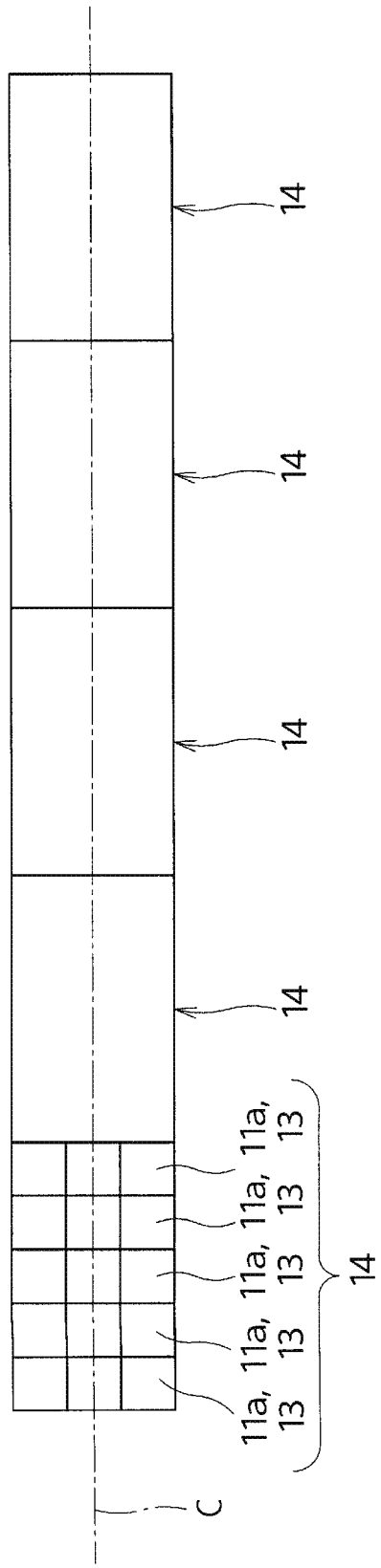
FIG. 6 is a plan view illustrating a plurality of bulk superconductors provided on a magnetic pole of the radial flux synchronous machine according to an embodiment of the present invention.

Next, the radial flux synchronous machine 1 according to an embodiment of the present invention will be described with reference to FIGS. 2 to 6. The radial flux synchronous machine 1 is suitably used as a generator using renewable energy, an electric motor for a propulsor of a ship, and the like. FIG. 3 is a cross-sectional view taken along line III-III in FIG. 2, FIG. 4 is an enlarged view corresponding to the portion IV in FIG. 3, and FIG. 5 is an enlarged view corresponding to the portion V in FIG. 2. FIG. 6 is a plan view illustrating the bulk superconductor described later.

As illustrated in FIGS. 2 to 5, the radial flux synchronous machine 1 includes a stator 10 in a cylindrical shape provided with a plurality of magnetic poles 11, the inner rotor 20 at least a part of which is disposed radially inward of the stator 10, and the outer rotor 30 disposed radially outward of the stator 10.

Among them, the stator 10 is on a field side, and as described above, the magnetic pole 11 is provided. Specifically, the stator 10 has a first tubular portion 10a and a second tubular portion 10b formed in a hollow cylindrical shape. Of them, the first tubular portion 10a is positioned on a front side (left side in FIG. 2) in the axial direction relative to the second tubular portion 10b. In the present embodiment, the first tubular portion 10a has a thickness along the radial direction smaller than that of the second tubular portion 10b. However, it is not limited to this, and the thickness along the radial direction of the first tubular portion 10a may not be thinner than that of the second tubular portion 10b as long as high magnetic permeability, high insulation for suppressing overcurrent, low thermal conductivity, and high mechanical strength can be secured. The first tubular portion 10a and the second tubular portion 10b are formed of a non-magnetic material such as stainless steel (SUS), for example. The first tubular portion 10a and the second tubular portion 10b may be formed by combining a plurality of materials, for example. For example, the first tubular portion 10a and the second tubular portion 10b may be configured by combining a non-magnetic body, a metal material used for electromagnetic shielding and the like, Stycast (registered trademark) for maintaining favorable thermal conductivity and electrical insulation, a glass fabric epoxy resin laminate (for example, G-10 defined in the NEMA standard), and the like.

The magnetic pole 11 of the stator 10 is provided in the first tubular portion 10a. In the present embodiment, as illustrated in FIG. 3, 16 magnetic poles 11 are provided, and these magnetic poles 11 are arranged at equal intervals along the circumferential direction.

As illustrated in FIGS. 4 and 5, each magnetic pole 11 includes a magnet 11a. In the present embodiment, the magnet 11a includes a bulk superconductor 13. This bulk superconductor 13 is a lump of crystal of a superconductor, and a magnetic field (magnetic flux) is introduced into the superconductor at equal to or less than a temperature at which the superconductor that is its base exhibits a superconducting transition, that is, a critical temperature, whereby a magnetic flux line can be trapped in the bulk superconductor 13 to function as a magnet having a higher magnetic flux density than a permanent magnet. For the bulk superconductor 13, for example, GdBCO (GdBa$_2$Cu$_3$O$_7$-z), which is a high-temperature bulk superconductor, is used.

Such the bulk superconductor 13 may be magnetized by pulse magnetization or may be magnetized by static magnetic field magnetization. In the pulse magnetization, the bulk superconductor 13 is retained at a temperature lower than the superconducting critical temperature, a magnetic flux is introduced into the bulk superconductor 13 by instantaneously applying a strong magnetic field, the magnetic flux is trapped in the bulk superconductor 13 by a pinning effect, and the bulk superconductor 13 functions as a magnet having a high magnetic flux density. In the static magnetic field magnetization, the bulk superconductor 13 is retained at a temperature higher than the superconducting critical temperature, a magnetic flux is introduced into the bulk superconductor 13 by applying a stationary magnetic field (static magnetic field), then the temperature is lowered and retained to a temperature lower than the superconducting critical temperature, the magnetic flux is trapped in the bulk superconductor 13 by a pinning effect, and the bulk superconductor 13 functions as a magnet having a high magnetic flux density. In general, the static magnetic field magnetization can cause a magnetized object such as the bulk superconductor 13 to trap more magnetic flux lines than the pulse magnetization.

In each magnetic pole 11, a plurality of the bulk superconductors 13 (magnets 11a) are arranged. Specifically, as illustrated in FIGS. 4 and 5, each magnetic pole 11 includes a first fixing member 12 fixed to the stator 10, a bulk aggregate 14 including the plurality of bulk superconductors 13 disposed radially outside the first fixing member 12, and a second fixing member disposed radially outside the bulk aggregate 14 and holding and fixing the bulk aggregate 14 between the first fixing member 12 and the second fixing member 15.

Of them, the first fixing member 12 is formed of oxygen free high conductivity copper (OFHC). The first fixing member 12 is formed with a recess portion 12a that is recessed radially inward and has a flat bottom surface. The bulk superconductor 13 is accommodated in this recess portion 12a.

The first fixing member 12 is provided with a first piping member 12b extending in the axial direction from a surface (right side in FIG. 5) on a rear side in the axial direction of the first fixing member 12. This first piping member 12b is coupled to a second piping member 12c extending in the axial direction. The second piping member 12c is coupled to the second tubular portion 10b of the stator 10 (not illustrated). Each of the first piping member 12b and the second piping member 12c may be piping formed of, for example, stainless steel (SUS) or the like. It is configured that in the first piping member 12b and the second piping member 12c, a refrigerant not illustrated convects, and the first piping member 12b and the second piping member 12c each serve as a thermosiphon device.

Next, the bulk aggregate 14 will be described. As described above, the bulk aggregate 14 includes the plurality of bulk superconductors 13. In the present embodiment, five bulk aggregates 14 are arranged in one magnetic pole 11 (see FIG. 5). Each of the plurality of bulk superconductors 13 of such a bulk aggregate 14 has a rectangular shape in a cross section along a direction orthogonal to the axial direction (see FIG. 4), and has a square shape when viewed from the outside in the radial direction (see FIG. 6). This makes it possible to secure isotropic magnet properties in the bulk superconductor 13. The bulk superconductor 13 may have a shape other than a square shape (for example, a rectangular shape) when viewed from the outside in the radial direction. When the bulk superconductor 13 has a square or rectangular shape when viewed from the outside in the radial direction, it is possible to cause the bulk superconductor 13 to efficiently trap a magnetic flux line. This makes it possible to increase the total magnetic flux amount in the bulk superconductor 13, and improve the torque and output of the radial flux synchronous machine 1.

In the present embodiment, as illustrated in FIGS. 4 and 6, in one bulk aggregate 14, 15 bulk superconductors 13 are arranged in 3 rows by 5 columns in the recess portion 12a. That is, as illustrated in FIGS. 4 and 6, three bulk superconductors 13 are arranged along the circumferential direction in one bulk aggregate 14 when viewed from the axial direction. As illustrated in FIG. 6, five bulk superconductors 13 are arranged along the axial direction. As described above, since the plurality of bulk superconductors 13 are arranged along the circumferential direction and the plurality of them are arranged along the axial direction, it is possible to easily secure a wide magnetic flux trapping region. This makes it possible to increase the total magnetic flux amount in the magnetic flux trapping region, and improve the torque and output of the radial flux synchronous machine 1. The bulk superconductors 13 adjacent to each other are arranged in a state of being in contact with each other, and the plurality of bulk superconductors 13 are aggregated at a high density.

In the present embodiment, as illustrated in FIGS. 5 and 6, five bulk aggregates 14 are arranged in one magnetic pole. That is, 75 bulk superconductors 13 are arranged in one magnetic pole. In this case, as illustrated in FIG. 4, in one magnetic pole, each bulk superconductor 13 (magnet 11a) is disposed such that the plurality of bulk superconductors 13 (magnets 11a) have a rectangular shape as a whole when viewed from the axial direction of the inner rotor 20. That is, the bulk aggregate 14 has a rectangular shape when viewed from the axial direction of the inner rotor 20. This makes it possible to cause the bulk superconductor 13 to efficiently trap a magnetic flux line. This makes it possible to increase the total magnetic flux amount in the bulk superconductor 13, and improve the torque and output of the radial flux synchronous machine 1. The bulk aggregate 14 has a rectangular shape when viewed from the axial direction of the inner rotor 20, whereby it is possible to provide a desired magnetic field distribution from the magnetic pole 11 to the inner armature 21 and the outer armature 31 described later. In one magnetic pole, each bulk superconductor 13 is disposed so that the entire contour has a rectangular shape elongated in the axial direction.

As illustrated in FIGS. 4 and 5, such the bulk aggregate 14 is held and retained between the first fixing member 12 and the second fixing member 15. The second fixing member 15 that retains the bulk aggregate 14 is formed of a non-magnetic material such as stainless steel (SUS), for example.

Here, as illustrated in FIG. 5, the magnetic pole 11 described above is fixed to the first tubular portion 10a of the stator 10 via a magnetic pole fixing member 16. The magnetic pole fixing member 16 includes a plurality of first magnetic pole fixing members 16a attached to the radially inner surface of the first fixing member 12, a plurality of second magnetic pole fixing members 16b attached to the radially outer surface of the second fixing member 15, and a third magnetic pole fixing member 16c attached to a surface on the front side (left side in FIG. 5) in the axial direction of the first fixing member 12. Such the magnetic pole fixing member 16 can be formed of various materials as long as it satisfies mechanical specifications, and is formed of a material having low thermal conductivity such as fiber-reinforced plastic (FRP).

Next, the inner rotor 20 will be described. The inner rotor 20 is rotatable about the rotation axis C. As illustrated in FIG. 2, the inner rotor 20 has a main body portion 20a formed in a cylindrical shape, and a blade attachment portion 20b positioned on the front side (left side in FIG. 2) in the axial direction relative to the main body portion 20a. Of them, the main body portion 20a is disposed radially inward of the stator 10, and has a thickness along the radial direction thinner than that of the blade attachment portion 20b. The blade attachment portion 20b is attached with the front blade 20A described above. In the illustrated example, the outer diameter of the blade attachment portion 20b is the same as the outer diameter of a main body portion 30a described later of the outer rotor 30. The main body portion 20a and the blade attachment portion 20b can be formed of various materials as long as it satisfies mechanical specifications, and are formed of, for example, fiber-reinforced plastic (FRP) or the like.

As illustrated in FIGS. 2 to 5, the inner rotor 20 has the inner armature 21 disposed radially inward of the stator 10 and opposing the magnetic pole 11 from radially inward. As illustrated in FIGS. 2, 4, and 5, the inner armature 21 includes inner teeth 22 protruding radially outward from the main body portion 20a, and an inner coil 23 wound around the inner teeth 22. Of them, the inner teeth 22 may be formed integrally with the main body portion 20a and the blade attachment portion 20b described above. The inner coil 23 may be formed of a winding wire made of, for example, copper or the like. In this case, the inner coil 23 may be wound around the inner teeth 22 by concentrated winding, or may be wound around the inner teeth 22 by distributed winding. A back yoke 24 is disposed radially inward of the inner coil 23. The back yoke 24 may be formed of a metal material containing iron as a main component.

Next, the outer rotor 30 will be described. Similarly to the inner rotor 20, the outer rotor 30 is rotatable about the rotation axis C. As illustrated in FIG. 2, the outer rotor 30 has the main body portion 30a formed in a cylindrical shape. This main body portion 30a is attached with the above-described rear blade 30A. The main body portion 30a can be formed of various materials as long as it satisfies mechanical specifications, and is formed of, for example, fiber-reinforced plastic (FRP) or the like.

As illustrated in FIGS. 2 to 5, the outer rotor 30 has the outer armature 31 disposed radially outward of the stator 10 and opposing the magnetic pole 11 from radially outward. As illustrated in FIGS. 2, 4, and 5, the outer armature 31 includes outer teeth 32 protruding radially inward from the main body portion 30a, and an outer coil 33 wound around the outer teeth 32. Of them, the outer teeth 32 may be formed integrally with the above-described main body portion 30a. The outer coil 33 may be formed of a winding wire made of, for example, copper or the like. In this case, the outer coil 33 may be wound around the outer teeth 32 by concentrated winding, or may be wound around the outer teeth 32 by distributed winding. A back yoke 34 is disposed radially outward of the outer coil 33. The back yoke 34 may be formed of a metal material containing iron as a main component.

The above-described inner rotor 20 and the outer rotor 30 are configured to be rotatable independently of each other. The inner rotor 20 and the outer rotor 30 are configured to rotate in opposite directions to each other.

Next, the operation according to the present embodiment will be described. Here, a power generation method using the electric motor-generator system 1A will be described.

First, the front blade 20A and the rear blade 30A rotate by the flow of sea water by the sea current, for example. At this time, the front blade 20A and the rear blade 30A rotate in opposite directions to each other.

By the rotation of the front blade 20A and the rear blade 30A, the inner rotor 20 and the outer rotor 30 rotate, respectively. At this time, for example, the inner rotor 20 rotates in the anticlockwise direction in FIG. 3, and the outer rotor 30 rotates in the clockwise direction in FIG. 3.

Here, when the inner rotor 20 and the outer rotor 30 rotate, power is generated by electromagnetic induction through a magnetic flux from the magnetic pole 11. At this time, the inner rotor 20 generates electric power by electromagnetic induction through a magnetic flux directed radially inward from the magnetic pole 11 and a magnetic flux directed radially inward from the magnetic pole 11 among the magnetic fluxes. On the other hand, the outer rotor 30 generates electric power by electromagnetic induction through a magnetic flux directed radially outward from the magnetic pole 11 and a magnetic flux directed radially outward from the magnetic pole 11 among the magnetic fluxes. Therefore, in the radial flux synchronous machine 1 according to the present embodiment, it is possible to generate electric power using both of the magnetic flux directed radially inward from the magnetic pole 11 and the magnetic flux directed radially inward to the magnetic pole 11, and the magnetic flux directed radially outward from the magnetic pole 11 and the magnetic flux directed radially outward to the magnetic pole 11. This makes it possible to achieve high power of the radial flux synchronous machine 1, and achieve high efficiency and high power density of the electric motor-generator system 1A. In this manner, power is generated.

As described above, according to the present embodiment, the radial flux synchronous machine 1 includes the stator 10 in a cylindrical shape provided with the plurality of magnetic poles 11, the inner rotor 20 disposed radially inward of the stator 10 and having the inner armature 21 opposing the magnetic pole 11 from radially inward, and the outer rotor 30 disposed radially outward of the stator 10 and having the outer armature 31 opposing the magnetic pole 11 from radially outward. This makes it possible to, when generating electric power, generate electric power using both of the magnetic flux directed radially inward from the magnetic pole 11 and the magnetic flux directed radially inward to the magnetic pole 11, and the magnetic flux directed radially outward from the magnetic pole 11 and the magnetic flux directed radially outward to the magnetic pole 11. Therefore, it is possible to improve the torque and output of the radial flux synchronous machine 1. As a result, it is possible to achieve high power of the radial flux synchronous machine 1, and achieve high efficiency and high power density of the electric motor-generator system 1A.

Since the stator 10 is provided with the magnetic pole 11, it is possible to suppress the plurality of magnetic poles 11 from being arranged along the radial direction. That is, as a comparative example, in a case where the stator has an armature and the inner rotor and the outer rotor are provided with magnetic poles, two magnetic poles are arranged along the radial direction. In this case, there is a possibility that the magnetic flux from the magnetic pole of the inner rotor and the magnetic flux from the magnetic pole of the outer rotor interfere with each other. Thus, when interference of the magnetic fluxes occurs, there is a possibility that the power generation efficiency of the radial flux synchronous machine is reduced and the output is lowered. On the other hand, in the present embodiment, since the stator 10 is provided with the magnetic pole 11, it is possible to suppress the plurality of magnetic poles 11 from being arranged along the radial direction. Therefore, it is possible to suppress interference between magnetic poles from occurring. As a result, it is possible to achieve high efficiency and high power density of the electric motor-generator system 1A.

According to the present embodiment, in one magnetic pole 11, each bulk superconductor 13 is disposed such that the plurality of bulk superconductors 13 have a rectangular shape as a whole when viewed from the axial direction of the inner rotor 20. This makes it possible to cause the bulk superconductor 13 to efficiently trap a magnetic flux line. This makes it possible to increase the total magnetic flux amount in the bulk superconductor 13, and improve the torque and output of the radial flux synchronous machine 1. It is possible to provide a desired magnetic field distribution from the magnetic pole 11 to the inner armature 21 and the outer armature 31 described later. In particular, in the present embodiment, the magnet 11a of the magnetic pole 11 includes the bulk superconductor 13. This makes it possible to provide an ideal magnetic field distribution from the magnetic pole 11 to the inner armature 21 and the outer armature 31.

According to the present embodiment, the magnet 11a includes the bulk superconductor 13. This makes it possible to easily increase the magnetic flux density from the magnetic pole 11. Therefore, it is possible to achieve further high efficiency and further high power density of the electric motor-generator system 1A.

EXAMPLES

Next, a radial flux synchronous machine 1 according to an example of the present invention will be described with reference to FIGS. 7 and 8. FIG. 7 is a view presenting a table summarizing "magnetic flux density", "diameter", "magnetic pole", "number of magnetic poles", and "teeth" of the radial flux synchronous machine 1 according to Example 1 and Example 2. FIG. 8 is a view presenting a table summarizing "maximum outputs" of the inner rotor 20 and the outer rotor 30 of the radial flux synchronous machine 1 according to Example 1 and the Example 2.

Example 1

The maximum outputs of the inner rotor 20 and the outer rotor 30 were analyzed using magnetic field analysis software MagNet (version 7). At this time, the magnetic flux density was 6.0 tesla (T).

As illustrated in FIG. 7, the diameter of the radial flux synchronous machine 1 was 2 m, a magnetic pole including the plurality of bulk superconductors 13 was adopted as the magnetic pole 11, the number of magnetic poles 11 was 16, and M600-50A was adopted as each of the inner teeth 22 and the outer teeth 32.

As a result, as illustrated in FIG. 8, in the radial flux synchronous machine 1 of Example 1, the maximum output of the inner rotor 20 was 297 KW, and the maximum output of the outer rotor 30 was 171 kW.

Example 2

The maximum outputs of the inner rotor 20 and the outer rotor 30 were analyzed using the magnetic field analysis software MagNet (version 7) similarly to Example 1 except that a magnetic pole including a permanent magnet (NdFeB) was adopted as the magnetic pole 11 and the magnetic flux density was 0.24 tesla (T).

As a result, as illustrated in FIG. 8, in the radial flux synchronous machine 1 of Example 2, the maximum output of the inner rotor 20 was 66 KW, and the maximum output of the outer rotor 30 was 30 kW.

As described above, it was possible to obtain high outputs in the radial flux synchronous machines 1 of Examples 1 and 2. Therefore, it has been found that it is possible to achieve high efficiency and high power density of the electric motor-generator system 1A including the radial flux synchronous machine 1. In particular, it was possible to achieve extremely high output in the radial flux synchronous machine 1 of Example 1 including the plurality of bulk superconductors 13 in the magnetic pole 11.

Although the embodiment and examples of the present invention have been described above, the present invention is not limited to the above-described embodiment, and includes those in which various modifications and the like are made in the above-described embodiment. For example, although the power generation method using the electric motor-generator system 1A has been described, the electric motor-generator system 1A may be used as a propulsor of a ship. Also in this case, since it is possible to improve the output of the radial flux synchronous machine 1, it is possible to achieve high power of the radial flux synchronous machine 1, and achieve high efficiency and high power density of the electric motor-generator system 1A.

In the radial flux synchronous machine 1 of the embodiment, an example in which one magnetic pole 11 includes five bulk aggregates 14 has been described, but the number of bulk aggregates 14 may be another aspect. Similarly, an example in which the bulk aggregate 14 includes 15 bulk superconductors 13 has been described, but the number of bulk superconductors 13 may be another aspect. The material of the bulk superconductor 13 is not limited to GdBCO.

In the radial flux synchronous machine 1 of the embodiment, an example in which the number of magnetic poles 11 is 16 has been described, but this number may also be another aspect.

The bulk superconductor 13 of the embodiment has been described to have a rectangular shape when viewed from the outside in the radial direction, but may have a circular shape or the like.

In the present embodiment, the radial flux synchronous machine 1 is provided with the bulk superconductor 13, but may be provided with a superconducting wire material.

In the present embodiment, an example in which each magnetic pole 11 includes the plurality of magnets 11a has been described, but the number of magnets 11a included in each magnetic pole 11 may be one.

In the present embodiment, an example has been described in which in one magnetic pole, each bulk superconductor 13 is disposed such that the plurality of bulk superconductors 13 have a rectangular shape as a whole when viewed from the axial direction of the inner rotor 20. However, not limited to this, in one magnetic pole, the plurality of bulk superconductors 13 may be arranged so as to have a shape (for example, a racetrack shape, an elliptical shape, or the like) other than a rectangular shape as a whole when each bulk superconductor 13 is viewed from the axial direction of the inner rotor 20. In this case, for example, in order to bring the magnetic field distribution along the circumferential direction from the magnetic pole 11 close to a desired distribution, the bulk aggregate 14 including the plurality of bulk superconductors 13 may be processed into a shape other than a rectangular shape by cutting or the like.

In the present embodiment, an example in which the magnet 11a includes the bulk superconductor 13 has been described, but the magnet 11a may include a permanent magnet.

Furthermore, in the present embodiment, an example has been described in which the electric motor-generator system 1A includes the front blade 20A coupled to the inner rotor 20 and the rear blade 30A coupled to the outer rotor 30. However, not limited to this, in the electric motor-generator system 1A, the rear blade 30A may be coupled to the inner rotor 20, and the front blade 20A may be coupled to the outer rotor 30. As described above, the front blade 20A is configured to be positioned on an upstream side in a flow direction of a fluid (for example, sea water) relative to the rear blade 30A. Due to this, in the electric motor-generator system 1A, the input torque acting on the front blade 20A becomes larger than the input torque acting on the rear blade 30A. Therefore, since the front blade 20A is coupled to the outer rotor 30, large input torque acting on the front blade 20A can be received by the outer armature 31 of the outer rotor 30. The outer armature 31 becomes larger in dimensions than the inner armature 21. Due to this, the large input torque acting on the front blade 20A is received by the outer armature 31 that is larger in dimensions than the inner armature 21, whereby it is possible to improve the output of the radial flux synchronous machine 1 as compared with the case where the input torque acting on the front blade 20A is received by the inner armature 21. As a result, it is possible to achieve further high power of the radial flux synchronous machine 1, further improve the power generation efficiency of the radial flux synchronous machine 1, and achieve further high power density.

The invention claimed is:

1. A radial flux synchronous machine comprising:
a stator in a cylindrical shape provided with a plurality of magnetic poles;
an inner rotor disposed radially inward of the stator and having an inner armature opposing the magnetic pole from radially inward; and
an outer rotor disposed radially outward of the stator and having an outer armature opposing the magnetic pole from radially outward,
wherein each of the magnetic poles includes a plurality of magnets,
wherein each magnet includes a bulk superconductor,
wherein, in each magnetic pole, a plurality of the bulk superconductors are arranged along the circumferential direction and the plurality of the bulk superconductors are arranged along the axial direction of the inner rotor, and
wherein, in each magnetic pole, each of the bulk superconductors is arranged such that the respective plurality of the magnets have a rectangular shape as a whole when viewed from an axial direction of the inner rotor.

2. The radial flux synchronous machine according to claim 1, wherein the inner armature includes inner teeth protruding radially outward and an inner coil wound around the inner teeth.

3. The radial flux synchronous machine according to claim 1, wherein the outer armature includes outer teeth protruding radially inward, and an outer coil wound around the outer teeth.

4. An electric motor-generator system comprising:
a base portion;
a radial flux synchronous machine attached to the base portion, the radial flux synchronous machine including,
a stator in a cylindrical shape provided with a plurality of magnetic poles,
an inner rotor disposed radially inward of the stator and having an inner armature opposing the magnetic pole from radially inward, and
an outer rotor disposed radially outward of the stator and having an outer armature opposing the magnetic pole from radially outward;
a front blade coupled to the inner rotor; and
a rear blade coupled to the outer rotor,
wherein each of the magnetic poles includes a plurality of magnets,
wherein each magnet includes a bulk superconductor,
wherein, in each magnetic pole, a plurality of the bulk superconductors are arranged along the circumferential direction and the plurality of the bulk superconductors are arranged along the axial direction of the inner rotor, and
wherein, in each magnetic pole, each of the bulk superconductors is arranged such that the respective plurality of the magnets have a rectangular shape as a whole when viewed from an axial direction of the inner rotor.

5. The electric motor-generator system according to claim 4, wherein the inner armature includes inner teeth protruding radially outward and an inner coil wound around the inner teeth.

6. The electric motor-generator system according to claim 4, wherein the outer armature includes outer teeth protruding radially inward, and an outer coil wound around the outer teeth.

* * * * *